INVENTOR.
DOUGLAS E. BLACK.
BY
ATTORNEY.

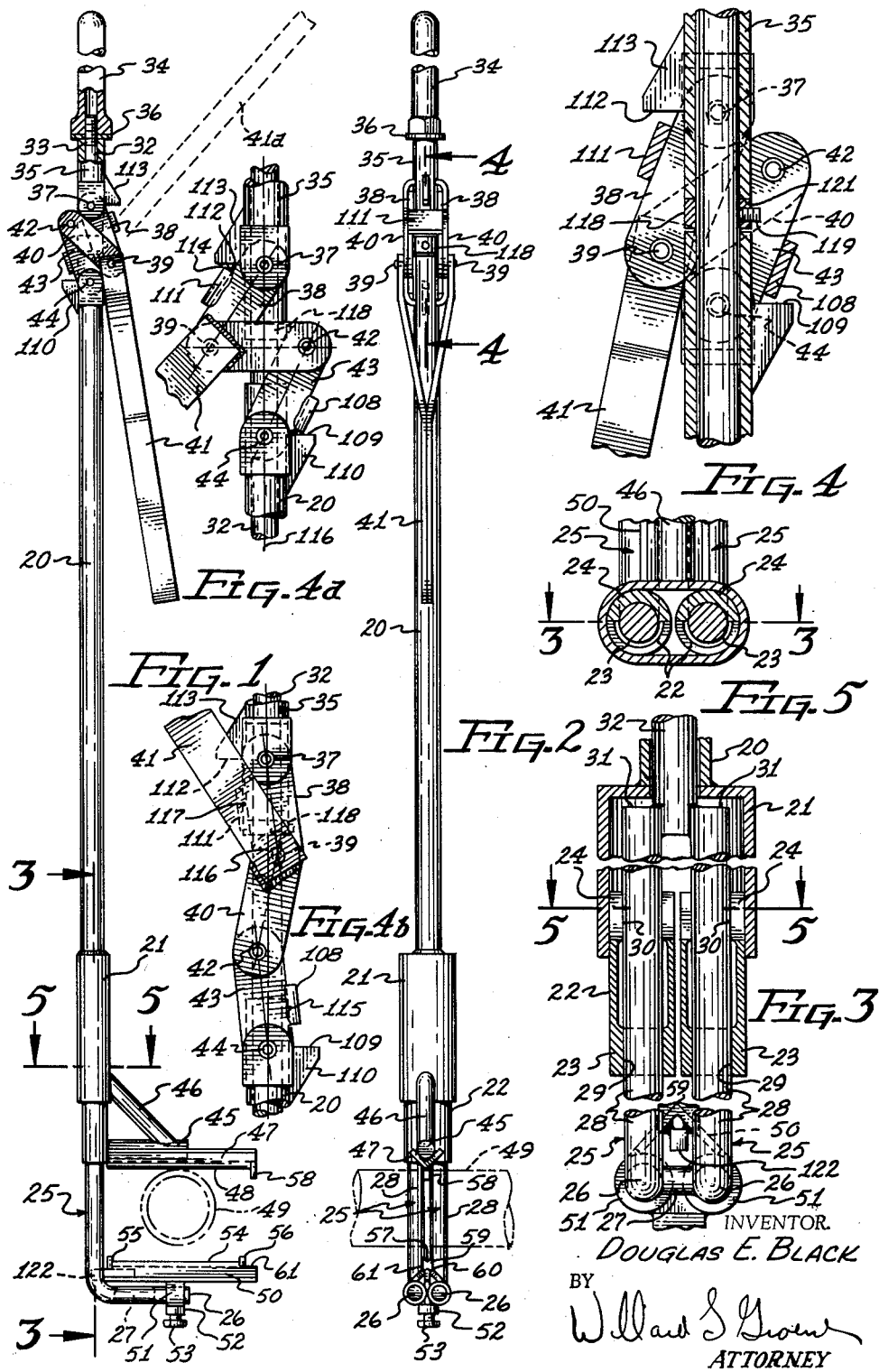

United States Patent Office 3,156,444
Patented Nov. 10, 1964

3,156,444
PIPE SQUEEZING APPARATUS FOR CONTROLLING FLOW THROUGH PLASTIC PIPE
Douglas E. Black, 2044 W. Palo Verde Drive, Phoenix, Ariz.
Filed Dec. 11, 1961, Ser. No. 158,498
7 Claims. (Cl. 251—7)

This invention pertains to apparatus for controlling a plastic pipe line and is particularly directed to a pipe squeezer for shutting off flow in such pipes.

This application is a continuation-in-part application of application Serial Number 78,696, filed December 27, 1960.

Plastic pipe carrying natural gas and other fluids presents many problems. Among these problems was the fact no suitable or safe way was heretofore available for shutting off the flow in the plastic pipe when an emergency arose, except to go to a valve which might shut down a large number of customers between the valve and the break in the line. Most breaks are caused by workers excavating or running ditches across the plastic lines.

One of the objects of the present invention is to provide apparatus for controlling a plastic pipe line for making repairs with a minimum of effort and time being expended and with a maximum of safety for the workers repairing the line.

Another object is to provide an apparatus adapted to reach down in a trench and grip a plastic pipe line behind the break and immediately shut off the gas and to proceed to repair the break without inconvenience to customers who might otherwise have been shut off by the prior methods. Should the break be in a service line only, then only a particular customer would be out of gas for a short time while repairs were made.

Previous to the instant development it was the practice to sometimes repair a damaged pipe line "hot" or by jumping in a new section of pipe without shutting off the flow of gas. Such unsatisfactory and unsafe procedures are completely eliminated by the present apparatus.

Another object is to provide a plastic pipe control apparatus which greatly improves pubilc safety by being able to shut off the fire hazard of escaping gas during national emergencies and catastrophes.

And a further object is to provide apparatus for pinching closed plastic or other types of pipe and tubing to control fluid flow in the pipe.

A further object is to provide a pipe squeezer or pinching tool, for shutting off flow in a pipe, which is light of weight for easy handling but strong enough to pinch off relatively large sized pipes.

Further features and advantages of this invention will appear from a detailed description of the drawings in which:

FIG. 1 is a side elevation of a plastic pipe squeezing device incorporating features of this invention.

FIG. 2 is a front elevation of the device shown in FIG. 1.

FIG. 3 is a fragmentary enlarged section on the line 3—3 of FIGS. 1 and 5.

FIG. 4 is a fragmentary enlarged section on the line 4—4 of FIG. 2.

FIG. 4a is an enlarged view showing the toggle linkage in intermediate position.

FIG. 4b is an enlarged view showing the toggle linkage in overcenter locked position.

FIG. 5 is a fragmentary enlarged section on the line 5—5 of FIGS. 1 and 3.

Figure 7:
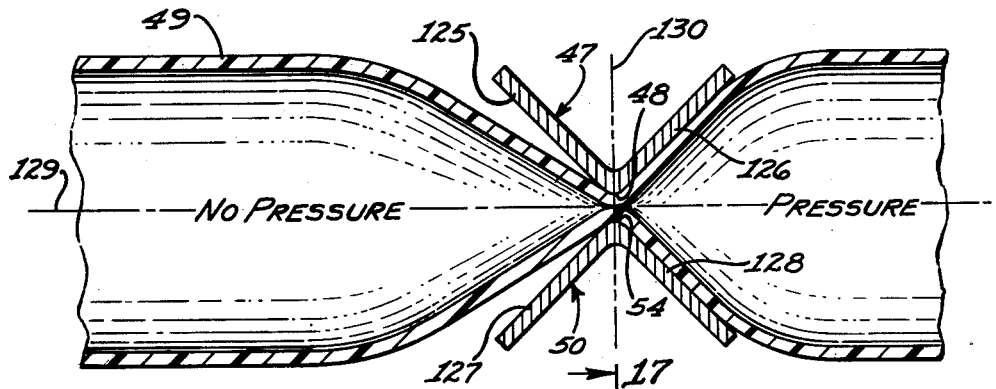
FIG. 7 is an enlarged fragmentary section on the line 7—7 of FIG. 6.

As an example of one embodiment of this invention there is shown in FIGS. 1 to 5, inclusive, a pipe squeezing and shutting off tool comprising a hollow tubular body member 20 to the lower end of which is fixed the elongated oval casing 21. To the lower end of the casing 21 is fixed the guide bushing sleeves 22 which in turn has the guide bushings 23 fixed to its lower end and the half-bushings 24 fixed to its upper end. A pair of L-shaped jaw members 25 have horizontal portions 26 securely welded together at 27, and vertically disposed portions 28 which slide axially in the bores 29 and 30 of the bushings 23 and 24. The upper ends 31 of the portions 28 of the L-shaped member 25 are rigidly fixed to the lower ends of the operating rod 32 which extends upwardly through the tubular body member 20.

The operating rod 32 may be reciprocated relative to the body member 20 by any suitable manually operated or power operated mechanism. One example of such mechanism is that shown in FIGS. 1, 2, 4, 4a and 4b wherein the upper end of the rod 32 is provided with threads 33 upon which is adjustably threadedly mounted the handle 34. A sleeve 35 is slidably mounted on the operating rod 32 and has its upper end in abutting contact with the thrust washer 36 which in turn abuts the lower end of the handle 34. The handle 34 is provided for gripping and manipulating the pipe squeezer in presenting it on the pipe to be squeezed. It further provides the adjusting means for setting the pipe engaging elements before squeezing the pipe. The sleeve 35 is pivotally connected at 37 to a pair of toggle links 38 which in turn are pivotally connected at 39 to a pair of operating links 40 to which is fixed the operating lever 41. The other end of the operating links 40 are pivotally connected at 42 to toggle links 43 which in turn are pivotally connected at 44 to the upper end of the body member 20. When the operating lever 41 is in lowered position as shown in FIGS. 1 and 2, sleeve 35 is lowered to allow the rod 32 to drop the jaw members 25 to lowered position.

Gripping the handle 34 with one hand, the operating lever 41 is gripped with the other hand and the squeezer placed over the pipe 49. The lever 41 is then swung upwardly so that the toggle links are moved to the intermediate position shown in FIG. 4a. As the lever 41 is initially raised the cross bar 108 of the links 43 engages the abutment surface 109 of the lug 110 rigidly fixed to the tubular body member 20. In the initial raising of the lever 41 the cross bar 111 of the links 38 may engage the abutment surface 112 of the lug 113 fixed to the sleeve 35 to initiate the operation of the toggle linkage as the operating lever 41 is raised. The cross bars 108 and 111 are so positioned relative to their respective lugs 110 and 113 so that both cross bars do not simultaneously engage the lug during operation of the lever 41 but slight clearance is provided as at 114 in FIG. 4a to prevent binding of the linkage.

When the lever 41 is swung upwardly to position 41a as shown in FIG. 4b, the toggle links are straightened out and moved just over center to hold sleeve 35 in upper position against the thrust washer 36 and handle 34 causing the jaw members 25 to be moved and locked in raised position. Under these conditions cross bar 108 engages the tubular body member 20 at the point to stop the pivot connection 42 over center, to the left of the center line 116, FIG. 4b, of relative movement of the member 20 and operating rod 32. Similarly, the cross bar 111 engages the sleeve 35 at the point 117 to stop the pivot connection 39 over center, to the right of the center line 116, FIG. 4b. Thus both sets of toggle links 43–40 and 38–40 are locked in overcenter position with the pipe fully squeezed shut. A stop collar 118 locked to the operating rod 32 by a suitable set screw 119 is engaged by the bottom end 121 of the sleeve 35 just as the toggles 43–40 and 38–40 are moved out of overcenter locking position as lever 41 is moved back to open released position so as to positively move the rod 32 downwardly to open position.

Fixed to the guide bushing sleeves 22 is the horizontally outwardly extending bracket 45 to which is fixed the strut 46 which is also fixed to the casings 21. A V-shaped pipe engaging anvil piece 47, FIG. 2, is rigidly fixed to the bracket 45 and has a slightly rounded pipe engaging knife edge 48 adapted to engage the plastic pipe 49. Mounted on the horizontal portions 26 of the L-shaped jaw members 25 is the pipe engaging V-shaped member 50, FIG. 2, having fixed thereto a pair of support rings 51, which loosely fit over the horizontal portions 26. A block 52 fixed to the rings 51 and carrying a screw 53 serves to position the pipe engaging member 50 to the L-shaped jaw members 25 so that the V-shaped member 50 is free to rock on the horizontal portions 26. The L-shaped members 25 are bent a few degrees beyond 90 degrees to allow for the downward spring or give in the L-shaped members 25 during the squeezing operation to take care of variations in the setting of handle 34 for overcenter locking of the toggle. The pipe engaging member 50 is rockingly held in place by the rings 51 and lug 122 on the portions 26 of the members 25 to thus effect proper parallel daylight opening for seating of the edge 54 on the pipe relative to the cooperating edge 48 of the anvil. The pipe engaging member 50 has a slightly rounded pipe engaging edge 54 and adjacent angularly related side faces adapted to engage the pipe 49 at diametrically opposite positions from the point of engagement of the pipe engaging edge 48 with the pipe. The guide lug 122 is fixed to the pipe engaging member 50 and slides up-and-down between the jaw members 25 to maintain the pipe engaging edge in alignment with the pipe engaging edge 48. This arrangement is important so as to avoid the necessity of critically axially positioning the handle 34 on the threads 33 for overcenter locking action since as the lever 41 moves to over center position the tendency to slightly release the member 48 and 54 causing leakage of the squeezed pipe is compensated by the spring in the members 25–27 to maintain the squeezed pipe against leakage. This spring inherent in the members 25–27 also prevents damage to the tool from improper axial setting of the handle 34.

In order to prevent damage to the pipe when it is squeezed between the pipe engaging edges 48 and 49, there is provided a pair of stop lugs 55 and 56 having upwardly facing V-notches 57 which receive each end of the pipe engaging edge 48 of the anvil 47 so that when the toggle operated by the lever 41 is locked in overcenter squeezed position for the pipe, FIG. 4b, the stop lugs 55 and 56 hold the pipe engaging edges 48 and 54 spaced an accurate parallel distance apart equal to substantially twice the wall thickness of the pipe 49. Further, in order to maintain the pipe engaging edges 48 and 54 in the same vertical plane during the squeezing operation there is provided a downwardly extending guide pin 58 fixed to the outer end of the pipe engaging anvil 47 which enters the slot 59 formed by the vertical sides 60 and 61 in the outer end of the pipe engaging member 50. In repairing a damaged pipe 49 in an emergency the pipe squeezing tool is applied to the pipe to squeeze it off as shown in FIG. 7.

Figure 6:
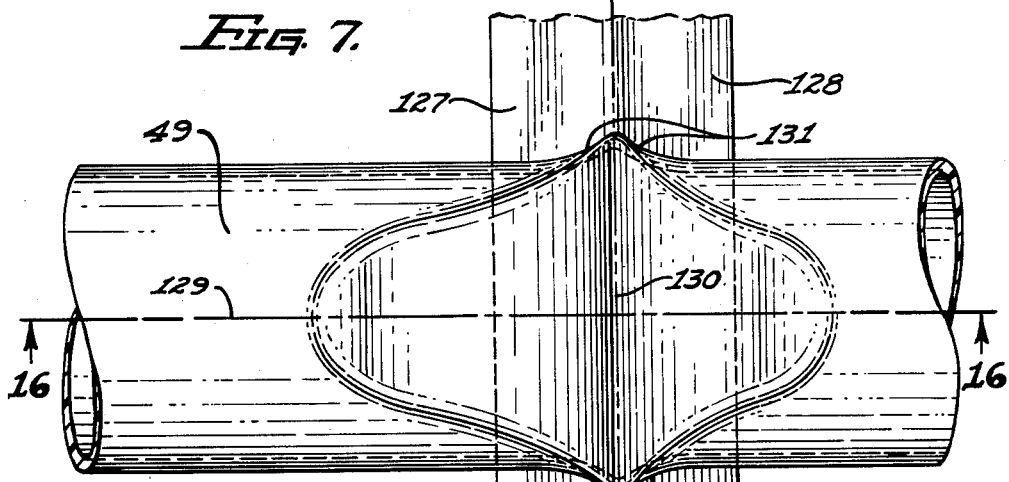
FIG. 6 is an enlarged fragmentary plan view of the pipe being squeezed, with the top pipe engaging anvil removed for clarity.
Figure 8:
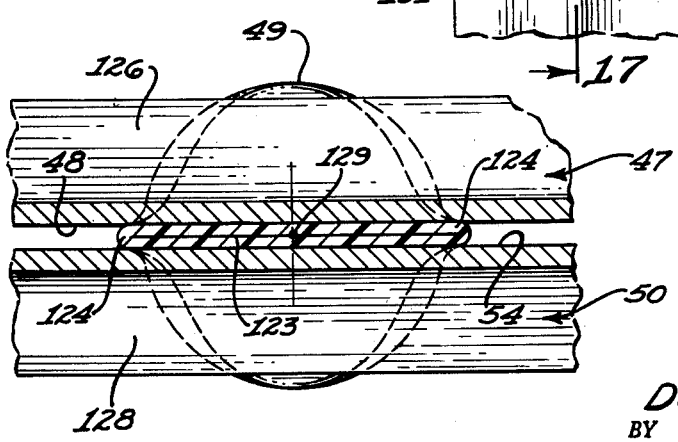
FIG. 8 is an enlarged fragmentary section on the line 8—8 of FIG. 6.

Referring particularly to FIGS. 6, 7 and 8, it will be noted that the pipe 49 is engaged by the squeezing elements in a particular manner so that in squeezing the pipe to control or "valve" the plastic pipe line a very minimum amount of damage will be suffered by the pipe. It will be noted that as the pipe engaging edges 48 and 54 come together and are finally stopped by the stop lugs 55 and 56, FIG. 1, the pipe is firmly pressed together along the line 123 but not excessively to cause fracturing of the pipe wall in the areas 124. Further, it is to be noted that the substantially right angularly disposed side faces 125 and 126 of the pipe engaging anvil 47 and the substantially right angularly disposed side faces 127 and 128 of the pipe engaging member 50 are positioned in substantially a 45° relationship to the pipe axis 129 and intersect at the respective pipe engaging lines 48 and 54, providing means to support the pipe during the squeezing operation. This is particularly true when pressure exists in the pipe line as shown best in the right side of FIG. 7 where the squeezed pipe under pressure is backed up by the surfaces 126 and 128 adjacent the plane of squeezing 130 between the slightly rounded edges 48 and 54. These surfaces 126–128 and 125–127 provide support for the pipe 49 and prevent the plastic pipe when squeezed, particularly under higher pressures, from breaking at the plane of squeezing 130, particularly when lateral stresses are applied to the pipe in the repairing operation. The relatively narrow slightly rounded edges 48 and 54 are adapted to squeeze the pipe shut with a minimum of lateral displacement and bending of the pipe in the areas 131 so as to avoid breaking or fracturing the pipe in these areas. In certain instances it is also found advantageous to wrap the pipe with a few turns of glass tape before applying the squeezer to help support the pipe in the areas 131 against possible damage in the squeezing operation.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A pipe squeezer for shutting off flow in plastic pipes comprising, an elongated body assembly which has a handle at one end thereof, a pair of spaced coplanar oppositely disposed relatively movable V-shaped pipe engaging members of greater length than the diameter of the pipe to be squeezed and having facing parallel apexes adapted to engage the plastic pipe when it is disposed transversely therebetween, each pipe engaging member connected at one end to the elongated body assembly adjacent its other end of said body assembly, the pipe engaging members at their ends opposite from those attached to the elongated body being free so that the movable members may be spaced from each other and slipped around the pipe section to be squeezed, said movable pipe engaging members each having flat external faces which meet at a pointed apex which is slightly rounded, the width of each of said faces being of substantial length with respect to the radius of the pipe so that the faces support the deflected pipe wall during squeezing, the faces of each pipe engaging member enclosing an angle of approximately 90°, and means associated with the pipe engaging members and the body assembly to move the members apart to permit the pipe to be received therebetween and to move the members together to engage and squeeze the pipe in substantial line contact.

2. The pipe squeezer as set forth in claim 1 wherein said means for moving the pipe engaging members comprises a toggle mechanism connected to the elongated body assembly adjacent the handle and which is activated by a lever connected thereto.

3. The pipe squeezer as set forth in claim 1 wherein the body assembly comprises a long tube telescopically mounted on a central rod member, one pipe engaging member being rigidly connected to the lower end of the tube and the other pipe engaging member being floatingly mounted on the lower end of the rod member.

4. The pipe squeezer as set forth in claim 3 wherein said means for moving the pipe engaging members comprises a toggle mechanism which is connected to both the elongated tube and the rod member for reciprocating these members with respect to each other, the toggle mechanism being activated by a lever which is connected thereto.

5. A pipe squeezer for shutting off flow in plastic pipes comprising, a long tubular member telescopically mounted on an operating rod, said members being reciprocably movably with respect to each other, a pair of spaced coplanar oppositely disposed V-shaped pipe engaging members of greater length than the diameter of the pipe to be squeezed and having facing parallel apexes adapted to engage the plastic pipe when it is disposed transversely therebetween, one pipe engaging member rigidly secured at one end to the tubular member adjacent its lower end and disposed perpendicular thereto, and the other pipe engaging member being yieldingly and floatingly mounted at one end to the rod member adjacent its lower end and disposed perpendicular thereto, said pipe engaging members each having flat external faces which meet at a pointed apex which is slightly rounded, the width of each of said faces being of substantial length with respect to the radius of the pipe, so that the faces support the deflected pipe wall during squeezing, the faces of each pipe engaging member enclosing an angle of approximately 90°, means associated with the tubular member and the operating rod to reciprocate the members with respect to each other so as to move the pipe engaging members apart so that the pipe can be fitted between them, and to move them together to engage and squeeze the pipe in substantial line contact, said means also providing an automatic locking of the pipe engaging members in pipe squeezing relation.

6. The pipe squeezer as set forth in claim 5 wherein the means for moving the pipe engaging members comprises a toggle mechanism connected to both the elongated tubular member and the rod member, the toggle mechanism being activated by a lever which is connected thereto.

7. The pipe squeezer as set forth in claim 5 wherein adjustable stop means with toggle is provided to adjust the clearance between the pipe squeezing members when they are in closed position.

References Cited by the Examiner

UNITED STATES PATENTS

| | | | |
|---|---|---|---|
| 698,874 | 4/02 | Towers | 251—7 |
| 1,897,743 | 2/33 | Warner | 251—9 |
| 2,070,143 | 2/37 | Schisler | 251—8 |
| 2,212,733 | 8/40 | Grigsby | 251—8 |
| 2,471,734 | 5/49 | Fischer | 81—363 XR |
| 2,614,788 | 10/52 | Woodward | 251—7 XR |
| 2,827,257 | 3/58 | Becker | 251—9 |

ISADOR WEIL, *Primary Examiner.*